(12) United States Patent
Taylor et al.

(10) Patent No.: US 6,753,438 B2
(45) Date of Patent: Jun. 22, 2004

(54) PROCESS FOR THE CONDENSATION OF COMPOUNDS HAVING SILICON BONDED HYDROXY OR ALKOXY GROUPS

(75) Inventors: Richard Gregory Taylor, Sully (GB); Stuart Leadey, Llandough (GB); Jean De La Croi Habimana, Braine le Comte (BE)

(73) Assignee: Dow Corning Corporation, Midland, MI (US)

(*) Notice: Subject to any disclaimer, the term of this patent is extended or adjusted under 35 U.S.C. 154(b) by 5 days.

(21) Appl. No.: 10/257,507

(22) PCT Filed: Apr. 11, 2002

(86) PCT No.: PCT/EP01/04176

§ 371 (c)(1),
(2), (4) Date: Oct. 11, 2002

(87) PCT Pub. No.: WO01/79330

PCT Pub. Date: Oct. 25, 2001

(65) Prior Publication Data

US 2003/0195370 A1 Oct. 16, 2003

(30) Foreign Application Priority Data

Apr. 15, 2000 (GB) .............................................. 0009289

(51) Int. Cl.$^7$ ............................. C07F 7/08; C08G 77/06
(52) U.S. Cl. ...................... 556/453; 524/783; 524/779; 524/786; 524/789; 528/17; 528/18; 528/25; 528/29; 556/456
(58) Field of Search ................................ 524/783, 779, 524/786, 789; 528/17, 18, 25, 29; 556/453, 456

(56) References Cited

U.S. PATENT DOCUMENTS 3,070,560 A 12/1962 Metevia ..................... 260/29.1
3,194,680 A 7/1965 Damm et al. ................ 117/155
5,292,799 A 3/1994 Naito et al. .................. 524/783
6,423,378 B1 * 7/2002 Cotting et al. .............. 427/387

FOREIGN PATENT DOCUMENTS

| GB | 1172661 | 1/1968 |
| JP | 9194816 | 7/1997 |
| JP | 9208925 | 8/1997 |
| WO | WO 9828375 | 7/1998 |

OTHER PUBLICATIONS

Chem. Abs 132:35809 (1999).

* cited by examiner

*Primary Examiner*—Peter O'Sullivan
(74) *Attorney, Agent, or Firm*—McKellar Stevens, PLLC; Robert L. McKellar

(57) ABSTRACT

The specification describes preparation of materials comprising selected boron anions and processes using them as catalysts for condensation reaction of compounds having silicon-bonded hydroxy or alkoxy groups. Preferred anion compounds comprise borates incorporating quadri-substituted boron in which the substituents include highly halogenated hydrocarbon groups for example pentafluorinated phenyl groups or bis (trifluoromethyl) phenyl groups. Preferred anions are $\{B(C_6F_5)_4\}^-$ and $\{B(C_6(CF_3)_2H_3)_4\}^-$. The specification describes condensation in presence of these materials of compounds having at least one unit according to the general formula $R^o{}_a R^1{}_b R^2{}_c SiO_{(4-(a+b+c)/2)}$ in which each $R^o$ is the same or different and represents a hydroxy, alkoxy, alkoxyalkoxy or hydrocarbonoxy group having up to 10 carbon atoms, each $R^1$ is the same or different and represents hydrogen or a monovalent substituted or unsubstituted hydrocarbon group, each $R^2$ is the same or different and represents a divalent substituted or unsubstituted alkylene or oxyalkylene group, a has a value of 1, 2, 3 or 4, b has a value of 0, 1, 2 or 3 and c has a value of 0, 1, 2 or 3.

17 Claims, No Drawings

PROCESS FOR THE CONDENSATION OF COMPOUNDS HAVING SILICON BONDED HYDROXY OR ALKOXY GROUPS

This application is a 371 of PCT/EP01/04176, filed Apr. 11, 2002.

This invention is concerned with the chemical reaction of compounds having silicon bonded hydroxy or alkoxy groups by way of condensation reactions.

It is well known that chain extension and crosslinking reactions of silicon containing compounds may be achieved readily by way of condensation of silicon bonded hydroxy, alkoxy or other condensable groups present in the compound or formed therein, for example, during the course of condensation. These reactions may be, for example, according to the schemes:

2~SiR$_2$OH→~SiR$_2$OSiR$_2$O~+H$_2$O, or

~SiR$_2$OH+ROSiR$_2$OR→~SiR$_2$OSiR$_2$OR+ROH where R represents a substituted or unsubstituted, saturated or unsaturated hydrocarbon group.

Such reactions are employed in commerce especially in the manufacture of polydiorganosiloxanes of elevated molecular weights and in the formulation of a variety of silicone compounds employed in one part or multi part form for a wide range of uses in which the compound is required to cure in situ to a crosslinked condition. The polymerisation of silanol containing oligomers HO (SiMe$_2$O)$_n$H (where Me represents a methyl group CH$_3$ and n has a value of, for example, from about 4 to about 40) to form silicone polymers of elevated molecular weight (i.e. n has a value in excess of 1,000) by condensation is an extremely important part of the process for manufacture of silicone polymer materials having viscosities varying from those of fluids to those of gums. It is well known that this chain extension process may be carried out batchwise or continuously. Typically the reaction is conducted in the presence of one or more catalyst materials.

Various acidic and basic materials are known for use as catalysts for reaction of organosilicon materials via silanol condensation reaction, for example potassium hydroxide, ammonium hydroxide, barium hydroxide, acid clays, sulphonic acids, and phosphazene bases. However, these catalysts tend to catalyse other reactions simultaneously in addition to condensation reactions and one consequence can be the presence of significant proportions of cyclic siloxanes in the product. Also, catalysts are required to perform consistently and should be capable of removal (along with other undesirable residues) from the product, and those for use in continuous production processes are required to perform rapidly. One type of material proposed for use in the manufacture of silicones of elevated molecular weight is a phosponitrile chloride. Although this material has a number of advantages as a catalyst for the polymerisation of organosilicon materials, it is produced and used in chlorinated solvents which are regarded as potentially environmentally hazardous and thus require special handling. It is also rather difficult to neutralise consistently in the polymer production. Furthermore the phosphonitrile chloride is susceptible to hydrolysis and on prolonged exposure to water loses catalytic activity.

Thus, despite the many proposals for catalysis materials for such condensation reactions there remains a desire to provide a material which can serve as an effective catalyst, which can be prepared by a simple process and which does not leave, within the bulk of the reaction product, residues which are difficult to neutralise or remove.

Surprisingly we have now found that condensation of compounds having silicon bonded hydroxy or alkoxy groups may be achieved in presence of a catalytic amount of one or more materials providing a source of anions comprising at least one quadri-substituted boron atom and protons capable of interaction with at least one silanol group.

The present invention provides in one of its aspects a process for the condensation of a compound having a silicon bonded hydroxy or alkoxy group in the presence of a catalytic amount of one or more materials providing in the reaction mixture an anion comprising at least one quadri-substituted boron atom and protons capable of interaction with at least one of said silicon bonded hydroxy or alkoxy groups.

In a process according to the invention, it is important that the boron containing anion does not itself form a covalent bond directly to a silicon atom and that it does not decompose or rearrange to produce an anion which forms a covalent bond directly to a silicon atom. Suitable materials include those incorporating one or more boron atoms disposed within a grouping and several, for example ten or more, halogen atoms connected with each boron atom. The halogen atoms in such compound may be connected to boron atoms by linkages incorporating at least one carbon atom. The halogen atoms are preferably selected from fluorine, chlorine and bromine, the most preferred being fluorine. Preferred anions incorporate one or more atoms of boron having four organic substitutes thereon the most preferred being quadri-substituted borates. The organic substituents are suitably hydrocarbon groups. Three and preferably four of these hydrocarbon groups are preferably aromatic groups, and are preferably highly halogenated. Preferred halogenated hydrocarbons are pentafluorinated phenyl groups and his (trifluoromethyl) phenyl groups and preferred materials have four such groups bonded to each boron atom. One operative material is the tetrakis (pentafluoro phenyl) borate anion (otherwise herein referred to as the perfluorinated aryl borate ion) and the material is preferably employed as the acid of this anion namely H$^+$ $\{(C_6F_5)_4B\}^-$. Other operative materials include anions having two quadri-substituted boron atoms for example, di-perfluoroinated aryl borate ions eg H$^+$ $\{B(C_6F_5)_3$ CNB $(C_6F_5)_3\}^-$. The preferred materials can be readily prepared from commercially available compounds by simple ion exchange techniques in innocuous solvents, for example, water or alcohol. We prefer to prepare the acids prior to introducing catalytic amounts of them to the reaction mixture.

Other suitable boron-containing anions for use in the process of the present invention include carboranes, for example of the formula: $\{CB_9H_{10}\}^-$, $\{CB_9X_5H_5\}^-$, $\{CB_{11}H_{12}\}^-$, and $\{CB_{11}X_6H_6\}^-$, wherein X represents fluorine, chlorine, bromine or iodine. Carboranes may contain boron atoms which are more highly substituted than quadri-substituted, eg penta-substituted and hexa-substituted, and for the sake of clarity, "quadri-substituted" where used herein is intended to include those anions containing quadri-substituted and higher substituted boron atoms.

In a process according to the invention, one may employ any suitable compound having silicon bonded hydroxy or alkoxy groups. Preferred materials are silanes and siloxane compounds having at least one unit according to the general formula:

$$R^\circ{}_a R^1{}_b R^2{}_c SiO_{(4-(a+b+c)/2)} \tag{i}$$

in which each R$^\circ$ represents a hydroxy, alkoxy, alkoxyalkoxy or hydrocarbonoxy group having up to 10 carbon atoms, each R$^1$ represents a hydrogen atom or a monovalent substituted or unsubstituted hydrocarbon group, each $R^2$ represents a divalent substituted or unsubstituted alkylene, or oxyalkylene group which is linked for example to another unit of formula (i) or an atom of a polymeric material, as referred to below a has the value of 1, 2, 3, or 4, b has a value of 0, 1, 2 or 3, c has a value of 0, 1, 2 or three and a+b+c has the value of 1, 2, 3 or 4. Suitable groups $R^o$ include, for example, hydroxy, methoxy, ethoxy, butoxy, phenoxy, and methoxyethoxy. Suitable groups $R^1$ include, for example, hydrogen, alkyl groups for example methyl, ethyl, propyl, isobutyl, hexyl, dodecyl or octadecyl, alkenyl for example, vinyl, allyl, butenyl, hexenyl or decenyl, alkynyl for example propargyl, aryl for example phenyl, aralkyl for example tolyl or xylyl, substituted hydrocarbon groups for example trifluoropropyl, chloropropyl or chlorophenyl. Suitable groups $R^2$ include for example, $-(CH_2)_n-$ where n has a value of 1, 2, 3 or more and $-(OCH_2CHR^3)_m-$ where $R^3$ represents H or $-CH_3$ and m has a value of greater than about 5. The compounds having at least one unit according to the general formula (i) may be monomeric, oligomeric or polymeric. The monomeric materials are preferably silanes in which $_c$ has a value of 0 and a+b has the of value 4. The polymeric materials may be predominantly organic materials or predominantly siloxane materials. Examples of suitable predominantly organic materials are those in which one or more units of formula (i) is incorporated in an organic polymer via its divalent group $R^2$. Examples of predominantly siloxane materials are polymers which incorporate units according to the general formula (ii) $R^1_s SiO_{(4-s)/2}$ where $R^1$ is as aforesaid and s has the value 0, 1, 2 or 3. Preferably, large proportions (preferably more than 80%) of these units are those where s has the value 2. If desired, these polymers may have one or more of the units of formula (i) attached via their divalent linkage $R^2$ to a silicon atom of the polymer.

In a process according to the invention, the compound having silicone bonded hydroxy or alkoxy groups may condense with the same, another or several other compounds having silicon bonded hydroxy or alkoxy groups. By appropriate variation of the values a+b+c and of the groups $R^o$, $R^1$ $R^2$ one may cause condensation reaction to provide products of a variety of molecular sizes, functionalities and reactivities which are thus suitable for a wide range of uses. As mentioned, the compounds according to the general formula: $R^o{}_a R^1{}_b R^2{}_c SiO_{(4-(a+b+c)/2)}$ may have one or more groups $R^o$. In a process according to the invention, a first one of these compounds may be caused to combine with a second one of these compounds by way of condensation of one $R^o$ group of each of the compounds. In this way, the first of these compounds may be employed to consume $R^o$ groups of the second of the compounds and to introduce a desired grouping to the second compound. For example, in the case where the first compound is a silane of formula (i) and the second compound is a polymer having units of the formula (i), by appropriate selection of the values of a one may bring about chain extending, chain branching or chain terminating condensation reactions, in which pairs of groups $R^o$ are consumed. Also by appropriate selection of values of a and values of b, groups $R^1$ may be introduced into the chain or at its ends. Introduction of alkenyl groups in this manner is of interest as providing a route to reaction via their unsaturation.

Particularly suitable materials having silicon bonded hydroxy or alkoxy groups include for example the di-hydroxy or alkoxy α,ω-dihydroxy-polydiorganosiloxanes according to the formula HO $(SiMe_2O)_n$H where n has a value from about 4 to about 40 and diethoxymethylvinylsilane and the mono-alkoxy material according to the general formula: $Me_3SiO(SiMe_2O)_n SiMe_3$ (where Me represents the methyl group $CH_3$ and n has a value from 0 to 100), ethoxydimethylvinylsilane, and methoxydimethylhexenylsilane and mixtures of two or more thereof.

In a process according to the present invention the compound or compounds having silicone bonded hydroxy or alkoxy groups are provided as a mass of material. In the case where manufacture of polymer is to be carried out, the mass is confined in a reaction vessel of the batch or continuous type. In the event one wishes to provide the groups $R^o$ on the compound by conversion of other groups eg Cl or CN, this may be done as a separate step or less preferably in the reaction mass of material. If more than one compound having silicon bonded hydroxyl or alkoxy groups is to be employed, the compounds may be introduced to the reaction vessel in any desired order. Catalyst is introduced to the reaction mass in any desired order and condensation reaction conducted at any desired temperature and pressure. The reaction may be carried out at room or elevated temperature with or without reduced pressure. The catalyst may be used at a concentration of from 1 to 500 ppm by weight based on the total reactants. The amount used may be varied according to the temperature used for the reaction. At room temperature we prefer to employ from 100 to 500 ppm whereas for reactions at 80° C. we prefer to employ 1 to 30 ppm.

If desired, various materials may be present in the reaction mixture, for example, solvents, reinforcing or extending fillers, co-catalysts, pigments, plasticisers, extenders or mixtures of any two or more thereof always provided they do not adversely influence the reaction.

The present invention is concerned with provision of catalysts for the homo- or co-condensation of materials having silicon bonded hydroxy, or alkoxy groups and especially but not exclusively with those which are particularly efficacious for the manufacture of higher molecular weight linear or branched polymeric organosilicon materials having desired pendant or terminal groups from silanols by batch or continuous processes. The catalyst materials employed in the present invention appear to catalyse the condensation reactions if and so long as condensable co-reactants are present. When such co-reactants are not present in sufficient quantities, these catalyst materials are capable of catalysing re-equilibration of the formed polymer to yield lower molecular weight polymer mixed with cyclic siloxanes. The catalytic activity may be terminated when it is no longer required, for example by neutralising the materials using a basic substance, such as an organic amine, or by heating to decompose the catalyst. This may be done at any stage of the process, for example when a desired viscosity has been achieved and before significant re-equilibration can take place.

A process according to the invention offers various advantages over prior known processes. The catalyst materials are stable to water and alcohol and their catalytic activity is not significantly reduced by exposure thereto. Preparation of the catalyst and the introduction of the catalyst to the polymerisation reaction without use of chlorinated solvents renders production and use of the catalyst more environmentally acceptable. The presence in the reaction product of undesirable residual catalyst and compounds derived therefrom is reduced not only due to absence of chloride ions but also due to the ease of neutralising the catalyst. Thus, for example, at least substantially linear polydiorganosiloxanes can be produced in a cleaner form due to the absence of chlorinated solvents from the catalyst and the process may be controlled so as to enable production of at least substantially linear polydiorganosiloxanes incorporating small proportions of cyclic silicones.

The word "comprising" where used herein is intended to embrace the notion of including as well as the notion of consisting of.

In order that the invention may become more clear there now follows a description of examples selected to illustrate the invention by way of example. In these examples unless the context states otherwise, the symbol Et represents the ethyl group, He represents the hexenyl group, Me represents the methyl group, Ph represents the phenyl group, Vi represents the vinyl group, all parts are by weight and all viscosities are determined at 25° C. and expressed in centipoise (1 poise=0.1 Pa·S).

EXAMPLE 1

Various materials for providing a source of (a) protons capable of interaction with at least one silanol group and (b) boron containing anions were prepared as follows.

Material comprising the acid $H^+\{B(C_6F_5)_4\}^-$ was prepared by two different methods, neither of which involved use of halogenated solvents. In the first method, 0.204 g of the anilinium salt $\{PhNHMe_2\}^+\{B(C_6F_5)_4\}^-$ was dissolved in 4 cc of a 50:50 by volume mixture of ethanol and water and 1 g of Amberlist 15 ion exchange resin was added. The mixture was shaken gently for 5 minutes and then allowed to stand for 2 hours at room temperature with occasional shaking. The ion exchange resin was filtered off and washed with ethanol water mixture (50:50 by volume) to provide a total volume of filtrate and washings of 10 cc. By titration, this liquid was found to contain the acid in a quantity corresponding to complete conversion of the anilinium salt to the acid $H^+\{B(C_6F_5)_4\}^-$. This mixture was employed as illustrative catalyst material 1 in the figures following examples.

In the second method, 0.205 g of the trityl salt $CPh_3^+\{B(C_6F_5)_4\}^-$ was heated in 45 cc of water at 50° C. for 30 minutes during which time the yellow trityl salt slowly dissolved producing an insoluble white deposit and colourless liquid. The mixture was allowed to cool and made up to 50 cc with water. By titration, the liquid was found to contain the acid in a quantity corresponding to complete conversion of the trityl salt to the acid $H^+\{B(C_6F_5)_4\}^-$. This liquid was employed as illustrative catalyst material 2 in the following examples.

Material comprising the acid $H^+\{B(C_6(CF_3)_2H_3)_4\}^-$ was prepared by dissolving 0.204 g of the sodium salt $\{Na\}^+\{B(C_6(CF_3)_2H_3)_4\}^-$ in 2 cc of a 50:50 by volume mixture of methanol and water and 1 g of Amberlist 15 ion exchange resin was added. The mixture was shaken gently for 5 minutes and then allowed to stand for 2 hours at room temperature with occasional shaking. The ion exchange resin was filtered off and washed with a mixture of methanol and water (50:50 by volume) to provide a total volume of filtrate and washings of 5 cc. By titration, this liquid was found to contain the acid in a quantity corresponding to complete conversion of the sodium salt to the acid $H^+\{B(C_6(CF_3)_2H_3)_4\}^-$. This liquid was employed as illustrative catalyst material 3.

EXAMPLE 2

A series of experiments was conducted to demonstrate polymerisation of linear polydiorganosiloxane in presence of perfluorinated aryl borate catalyst $H^+\{B(C_6F_5)_4\}^-$ in which a laboratory batch reactor was charged with 1500 parts of a compound having silicon bonded hydroxy or alkoxy groups namely an $\alpha,\omega$-dihydroxy-polydiorganosiloxane according to the formula: $HO(SiMe_2O)_nH$ where n has a value from about 4 to about 40 and 44 parts of 10 centipoise silicone fluid of the formula $Me_3SiO(SiMe_2O)_nSiMe_3$ (where n has a value from 0 to 100) and stirred while heating to a desired temperature in the range 60° C. to 100° C. and desired pressure. When the mixture had stabilised, illustrative catalyst material 1 as prepared in Example 1 was introduced in a desired concentration from 1 ppm to 30 ppm of the reaction mixture (ie from $1.1168\ 10^{-6}$ to $3.23872\ 10^{-5}$ moles of the anion per litre of reaction mixture). The reaction was allowed to proceed and was monitored by continual plotting of torque of the stirrer, silanol content and viscosity against time elapsed. As the reaction proceeded, the silanol content decreased, viscosity increased to a maximum and then reduced as end blocking occurred. The reaction was caused to cease by running the reaction mixture into a bottle containing triethylamine. The reaction product was identified as a polydiorganosiloxane according to the general formula $Me_3SiO(SiMe_2O)_nSiMe_3$ and the catalyst identified confirmed as unchanged, using NMR analysis.

Results of the series of experiments are shown in Tables 1 and 2. Table 1 shows the relative initial rate of silanol condensation at various pressures and temperatures with uniform catalyst concentration of 2.23 moles per litre (i.e. 20 ppm), as determined from the loss of silanol using Fourrier Transform Infra Red spectroscopy to measure the reduction of peak area for silanol loss. As can be appreciated, in general, the initial rate of silanol condensation is greater at higher temperatures and lower pressures, and a temperature of 80° C. and 10 mbar is operative.

TABLE 1

| | Temperature | | |
|---|---|---|---|
| Pressure | 60° C. | 80° C. | 100° C. |
| 1,000 mbar. | 1 | 4.41 | 19.89 |
| 75 mbar | 2.07 | 15.72 | 34.98 |
| 10 mbar | 8.04 | 16.50 | 34.25 |

Table 2 shows the relative initial rate of silanol condensation determined as described above, with reaction temperature of 80° C. and 10 mbar pressure and various concentrations of the catalyst. As can be appreciated, the silanol condensation proceeds faster in presence of increased amounts of the catalyst material.

TABLE 2

| Catalyst Level ppm catalyst | Catalyst Concentration (Moles/Liter) | Relative Initial Rate of Silanol Condensation |
|---|---|---|
| 1.0 | $1.1168\ 10^{-6}$ | 0.36 |
| 5.0 | $5.8400\ 10^{-6}$ | 1.00 |
| 10.0 | $1.11680\ 10^{-5}$ | 1.43 |
| 15.0 | $1.67250\ 10^{-5}$ | 1.71 |
| 20.0 | $2.23360\ 10^{-5}$ | 1.90 |
| 29.0 | $3.23872\ 10^{-5}$ | 2.23 |

When this polymerisation procedure was repeated, at 80° C. and 10 mbar pressure, using illustrative catalyst materials 2 and 3 instead of the illustrative catalyst material 1, similar results were obtained. When this polymerisation procedure was repeated, at 80° C. and 10 mbar pressure, using illustrative catalyst material 1 which had been stored for three months in a sealed volumetric flask with air at ambient temperature and pressure, similar results were obtained.

EXAMPLE 3

This example demonstrates preparation of a fourth illustrative catalyst material $Et_3Si^+[B(C_6F_5)_4]^-$ in absence of water and use thereof to polymerise silanol. Triethylsilane was added to a solution of $CPh_3^+[B(C_6F_5)_4]^-$ in dichloromethane (total volume 10 cm$^3$) at room temperature. After a little gas evolution, a bright orange solution was obtained. 0.4 cm$^3$ of this solution was added to 100 g of an α,ω-dihydroxy-polydiorganosiloxane according to the formula: $HO(SiMe_2O)_nH$ where n has a value from about 4 to about 40. The polysiloxane increased in viscosity in 3 minutes to a gum-like consistency. Further, when 20 ppm of the solution was used as the catalyst in the procedure described in Example 2 at 65° C. and 75 mbar pressure, the polysiloxane polymerised readily.

EXAMPLE 4

This example demonstrates heterocondensation of linear polydiorganosiloxane and a vinylalkoxysilane in presence of perfluorinated aryl borate catalyst $H^+\{B(C_6F_5)_4\}^-$. The laboratory batch reactor was charged with 1500 parts of an α,ω-dihydroxy-polydiorganosiloxane according to the formula: $HO(SiMe_2O)_nH$ where n has a value from about 4 to about 40 and 8.78 parts of ethoxydimethylvinylsilane and stirred while heating to 60° C. at atmospheric pressure. When the mixture had stabilised, 20 ppm of illustrative catalyst material 1 (i.e. 2.2336 10$^-$ moles per litre of reactant) was introduced. The reaction was allowed to proceed and was monitored by continual plotting of torque of the stirrer, silanol content and viscosity against time elapsed. After 5 minutes reaction at atmospheric pressure, the pressure was reduced to 75 mbar and the reaction continued for 40 minutes during which time the reaction mixture increased in viscosity and stabilised. The reaction was neutralised by running the reaction mixture into a bottle containing triethylamine. The reaction product was identified as a polydiorganosiloxane according to the general formula: $ViMe_2Si(SiMe_2O)_nSiMe_2Vi$ having a viscosity of 4840 (Brookfield viscometer). Analysis of the product showed a content of less than 0.2% cyclic siloxanes, less than 0.1% silanol and less than 0.1% $SiOCH_2CH_3$ groups. When the reaction was repeated at 80° C. using the same materials in the same amount except for using half the amount of ethoxydimethylvinylsilane, the product was identified as a polydiorganosiloxane according to the general formula $ViMe_2Si(SiMe_2O)_nSiMe_2Vi$ having a viscosity of 29,930 (Brookfield viscometer). Analysis of the product showed a content of less than 1% cyclic siloxanes.

EXAMPLE 5

This example demonstrates heterocondensation of linear polydiorganosiloxane and an alkenylalkoxysilane in presence of perfluorinated aryl borate catalyst $H^+\{B(C_6F_5)_4\}^-$. The laboratory batch reactor was charged with 1500 parts of an α,ω-dihydroxy-polydiorganosiloxane according to the formula $HO(SiMe_2O)_nH$ where n has a value from about 4 to about 40 and heated to 60° C. at 75 mbar pressure. When the mixture had stabilised, the vacuum was released and 4.65 parts of methoxydimethylhexenylsilane and then 20 ppm (i.e. 2.2336 10$^-$ moles per litre) of illustrative catalyst material 1 was introduced and the vacuum reapplied. The reaction was allowed to proceed and was monitored by continual plotting of torque of the stirrer, silanol content and viscosity against time elapsed. After 20 minutes reaction at 75 mbar the reaction mixture increased in viscosity and stabilised. The reaction was neutralised by running the reaction mixture into a bottle containing triethylamine. The reaction product was identified as a polydiorganosiloxane according to the general formula $HeMe_2Si(SiMe_2O)_nSiMe_2He$ having a viscosity of greater than 65,000. Analysis of the product showed a content of 0.36% cyclic siloxanes.

EXAMPLE 6

This example demonstrates preparation of a polymer with pendant groups by heterocondensation of linear polydiorganosiloxane and a vinyldialkoxysilane and end blocker in presence of perfluorinated aryl borate catalyst $H^+\{B(C_6F_5)_4\}^-$. The laboratory batch reactor was charged with 1500 parts of an α,ω-dihydroxy-polydiorganosiloxane according to the formula $HO(SiMe_2O)_nH$ where n has a value from about 4 to about 40, 46 parts of $Me_3SiO(SiMe_2O)_nSiMe_3$ (n=0 to 100) and 11.8 parts of diethoxymethylvinylsilane and stirred while heating to 80° C. at atmospheric pressure. When the mixture had stabilised, 20 ppm (ie 2.2336 10$^{-5}$ Moles per litre) of illustrative catalyst material 1 was introduced. The mixture was stirred for 60 minutes and the reaction was allowed to proceed and was monitored by continual plotting of torque of the stirrer, silanol content and viscosity against time elapsed. After 60 minutes reaction at atmospheric pressure, the pressure was reduced to 75 mbar and the reaction continued for 60 minutes during which time the reaction mixture increased in viscosity and stabilised. The reaction was neutralised by running the reaction mixture into a bottle containing triethylamine. The reaction product was identified as a polydiorganosiloxane according to the general formula: $(CH_3)_3SiO(Si(CH_3)_2O)_{570}(SiCH_3Vi)_{1.42}Si(CH_3)_3$ and a viscosity of 3225 (Brookfield viscometer). Analysis of the product showed a content of 1% cyclic siloxanes, and minor amounts of $SiOCH_2CH_3$ groups.

EXAMPLE 7

The laboratory batch reactor was charged with a mixture of 1500 parts of an α,ω-dihydroxy-polydiorganosiloxane according to the formula $HO(SiMe_2O)_nH$ where n has a value from about 4 to about 40 and 9.1 parts of an end endblocker according to the general formula, $ViMe_2SiO(SiMe_2O)_8SiMe_2Vi$. The mixture was heated to 80° C. under vacuum at 10 mbar pressure. When the reaction mixture had stabilised at the required temperature illustrative catalyst material 1 was introduced to it at a concentration of 20 ppm (2.23360e$^{-5}$ moles/l). The reaction was monitored by online measurement of stirrer torque, silanol level, and viscosity. Water was seen to be removed from the reaction in the form of vapour causing the reaction to foam and was accompanied by an increase in the viscosity and decrease in the silanol concentration as measured by the online probes. The viscosity of the reaction increased to a maximum as condensation proceeded and then fell as endblocking continued. The reaction was neutralised after 15 minutes by running the reaction mixture into a bottle containing a small amount of triethylamine (0.05 parts). Vinyl endblocked polymers 4, 5 and 6 according to the general formula $ViMe_2SiO(Me_2SiO)_nSiMe_2Vi$ were made using these proportions of starting materials. The values for viscosity, silanol content and n from NMR determination and number average molecular weight (as determined by GPC) of the polymers are shown in Table 3.

This procedure was repeated using 1500 parts of the α,ω-dihydroxy-polydiorganosiloxane according to the formula $HO(SiMe_2O)_nH$ where n has a value from about 4 to about 40 and 2764 parts of the endblocker according to the general formula: $ViMe_2SiO(SiMe_2O)_8SiMe_2Vi$ heated to 80° C. under vacuum at 10 mbar pressure. When the reaction mixture had stabilised at the required temperature the first illustrative catalyst was introduced to the mixture at a concentration of 20 ppm (2.23360e$^{-5}$ moles/l). Vinyl endblocked polymers 4, 5 and 6 were made using these proportions of staring materials. The values for viscosity, silanol content and n from NMR determination and number average molecular weight (GPC) of the polymers are shown in Table 3.

EXAMPLE 8

The laboratory batch reactor was charged with a mixture of 1500 parts of α,ω-dihydroxy-polydiorganosiloxane according to the formula HO(SiMe$_2$O)$_n$H where n has a value from about 4 to about 40 and 10 parts of a polysiloxane having silicon bonded hydrogen atoms according to the general formula HSiMe$_2$O(SiMe$_2$O)$_{18}$SiMe$_2$H. The mixture was heated to 80° C. under vacuum at 10 mbar pressure. When the reaction mixture had stabilised at the required the first illustrative catalyst was introduced to the mixture in a concentration of 20 ppm (2.23360 10$^{-5}$ moles/l). The reaction was monitored by online measurement of stirrer torque, silanol level, and viscosity. Water was seen to be removed from the reaction in the form of vapour causing the reaction to foam and was accompanied by an increase in the viscosity and decrease in the silanol concentration as measured by the online probes. The viscosity of the reaction increased to a maximum as condensation proceeded and then fell as endblocking continued. The reaction was neutralised after 10 minutes by running the reaction mixture into a bottle containing a small amount of triethylamine (0.05 parts). In this way SiH endblocked polysiloxane 10 according to the general formula HMe$_2$SiO(Me$_2$SiO)$_n$SiMe$_2$H was made. The values for viscosity, silanol content, n and number average molecular weight of the polymers are shown in Table 3.

An SiH endblocked polysiloxane 11 according to the general formula HMe$_2$SiO(Me$_2$SiO)$_n$SiMe$_2$H was made in the same way, by mixing 1500 parts of the α,ω-dihydroxy-polydiorganosiloxane according to the formula HO(SiMe$_2$O)$_n$H where n has a value from about 4 to about 40 and 48 parts of the Si—H endblocker HSiMe$_2$O(SiMe$_2$O)$_{18}$SiMe$_2$H and heating them to 80° C. under vacuum at 10 mbar pressure and then adding illustrative catalyst 1 at a concentration of 5 ppm (5.58400 10$^{-6}$ moles/l). The reaction was monitored by online measurement of stirrer torque, silanol level, and viscosity. The reaction was neutralised after 10 minutes by running the reaction mixture into a bottle containing a small amount of triethylamine (0.05 parts). The values for viscosity, silanol content, n and number average molecular weight of the polymers are shown in Table 3.

TABLE 3

| Polymer | Viscosity Centipoise | Final Silanol Content ppm (NMR) | n from NMR | Mn (number average Molecular weight by GPC) |
| --- | --- | --- | --- | --- |
| Vinyl endblocked polymer 1 | 134,400 | 97 | 1,389 | 84,900 |
| Vinyl endblocked polymer 2 | 114,400 | 147 | 1,417 | 69,900 |
| Vinyl endblocked polymer 3 | 158,400 | 256 | 666 | 72,800 |
| Vinyl endblocked polymer 4 | 7,300 | 332 | 412 | 37,600 |
| Vinyl endblocked polymer 5 | 9,600 | 261 | 448 | 30,300 |
| Vinyl endblocked polymer 6 | 13,056 | 296 | 432 | 45,300 |
| Si—H endblocked polymer 10 | 6,312 | 163 | 541 | 36,800 |
| Si—H endblocked polymer 11 | 5,850 | 76 | 627 | 37,100 |

EXAMPLE 9

In this Example, a laboratory reactor was used to demonstrate condensation reaction of silanol to polymerise polysiloxane in a continuous reactor in presence of the catalyst in different solvents. The continuous reactor used comprised a spiral tube of 6 mm diameter equipped with heater, inlet ports and collector vessel.

The borate catalyst H$^+${B(C$_6$F$_5$)$_4$}$^-$ was prepared in different carrier solvents as follows:-

Catalyst A consisted of 0.0115 g of the catalyst per 1 ml of water and ethanol mixed in a ratio of 1:1;

Catalyst B consisted of 0.0115 g of the catalyst per 1 ml of decanol, ethanol and water in a ratio of 3.5:1:0.5 and Catalyst C consisted of 0.021 g of the catalyst per 1 ml methyl ethyl ketone.

A mixture of 10 parts of an α,ω-dihydroxy-polydiorganosiloxane according to the formula HO(SiMe$_2$O)$_n$H where n has a value from about 4 to about 40 and 0.12 parts of 10 centipoise silicone fluid of formula Me$_3$SiO(SiMe$_2$O)$_n$SiMe$_3$ (where n has a value from 0 to 100) were mixed while heating to 142° C. The mixture was fed at a rate of 1.7 kg per hour via a venturi with air under pressure into the spiral of the reactor and the catalyst A was introduced to the flowing mixture. The catalyst A was introduced in separate runs at four different rates namely 15, 25, 50 and 70 microlitres per minute. The collected samples were neutralised with a solution of trihexylamine in cyclic methylpentasiloxane (0.54% N) fed at 2 ml/hr. The polymers produced were of the general formula Me$_3$SiO(SiMe$_2$O)$_n$SiMe$_3$. The values of n, and number average molecular weight (Mn) were determined by NMR analysis and the silanol content of the polymers produced were determined as in Example 2. The values are set out in Table 4.

TABLE 4

| Catalyst feed rate | Viscosity | n/Mn (by NMR) | ppm silanol/ % silanol end groups |
| --- | --- | --- | --- |
| 50 μl/min catalyst (20.5 ppm) | 13,232 | 420/31,366 | 640/58.9 |
| 20 μl/min catalyst (8.2 ppm) | 18,912 | 646/48,105 | 399/56.5 |
| 15 μl/min catalyst (6 ppm) | 25,120 | 570/42,488 | 460/57.3 |
| 70 μl/min catalyst (28.8 ppm) | 12,016 | 412/30,791 | 703/63.6 |

This experiment was repeated using catalyst B. The polysiloxane mixture was again introduced into the reactor at approximately 142° C. and the flow rate was set at approximately 1.7 kg/hr. The catalyst B was pumped in at 155 μl/min. The samples were neutralised with the trihexylamine in cyclic pentasiloxane mixture (0.54% N) feed at 2 ml/hr. Analysis of the polymer produced gave results as set out in Table 5. The alkoxy groups detected result from use of decanol in the catalyst solvent.

TABLE 5

| Catalyst Fed at | Viscosity | n/Mn by NMR | % alkoxy end groups | ppm silanol/ % silanol end groups |
|---|---|---|---|---|
| 155 μl/min (64 ppm) | 14,955 | 614/45,627 | 24.6 | 208/28.0 |

This experiment was repeated using catalyst C. The polysiloxane mixture was again introduced into the spiral of the reactor. The mixture was introduced into the reactor at approximately 156° C. and the flow rate was set at approximately 1.1 kg/hr. The catalyst C was pumped in at 25 μl/min. The samples were again neutralised with the trihexylamine in cyclic pentasiloxane mixture (0.54% N) fed at 2.5 ml/hr. Analysis of the resultant polymer as aforesaid gave values as shown in Table 6.

The run was repeated but using a higher flow rate of the polysiloxane mixture of 2.5 kg/hr, with all other values the same. Analysis of the resultant polymer as aforesaid gave values as shown in Table 6.

TABLE 6

| Polysiloxane mixture feed rate | Viscosity | n/Mn by NMR | ppm silanol/ % silanol end groups |
|---|---|---|---|
| 1.1 kg/h (29 ppm catalyst) | 25,984 | 693/51,500 | 299/45 |
| 2.5 kg/h (12.5 ppm catalyst) | 19,392 | 550/40,915 | 484/58 |

EXAMPLE 10

This example demonstrates preparation of a further illustrative catalyst material $H^+\{B(C_6F_5)_3CNB(C_6F_5)_3\}^-$. $B(C_6F_5)_3$ and KCN were weighed out and added to a reaction flask, to which diethylether was added followed by stirring for 12 hours. The solvent was then removed and replaced by dichloromethane, followed by addition of tritylchloride and further stirring for 12 hours. The solvent was then removed under vacuum, and the residue dissolved in 10 ml ethanol to give a green solution. To this solution 3 g Amberlist 15 ion exchange resin was added to give a pale green acidic solution.

EXAMPLE 11

This example demonstrates condensation polymerisation of linear polydiorganosiloxane in the presence of the catalyst prepared in Example 10 above.

1 kg of α,ω-dihydroxy-polydiorganosiloxane of the formula $HO(SiMe_2O)_nH$ where n has a value from about 4 to about 40 was added to a reaction vessel and heated to 100° C. to remove any excess water. 30.5 g of 10 centpoise trimethylsilyl-dimethylsiloxane endblocker was added followed by 20 ppm, 1.6 ml of the catalyst solution prepared in Example 10 above (0.25 g in 20 ml ethanol, 0.0125 g/ml). The reaction proceeded rapidly, with monitoring of silanol loss and viscosity change. After 20 minutes reaction the viscosity was 36500 centipoise.

EXAMPLE 12

This example demonstrates preparation of a further illustrative catalyst material $H^+\{CB_{11}H_{12}\}^-$.

0.327 g of $\{NHMe_3\}^+\{CB_{11}H_{12}\}^-$ was dissolved in ethanol to a total volume of 25 ml, followed by addition of 0.5 g Amberlist 15 ion exchange resin. The solution was shaken occasionally over 2 hours and tested with universal indicator paper showing an acidic solution.

EXAMPLE 13

This example demonstrates condensation polymerisation of linear polydiorganosiloxane in the presence of the catalyst prepared in Example 12 above.

1 kg of α,ω-dihydroxy-polydiorganosiloxane of the formula $HO(SiMe_2O)_nH$ where n has a value from about 4 to about 40 was added to a reaction vessel and heated to 100° C. to remove any excess water. 30.5 g of 10 centipoise trimethylsilyl-dimethylsiloxane endblocker was added followed by 20 ppm, 1.6 ml of the catalyst solution prepared in Example 12 above (0.327 g in 25 ml ethanol, 0.01308 g/ml). The reaction proceeded rapidly, with monitoring of silanol loss and viscosity increase. Silanol measurements showed a minimum after 60 seconds.

What is claimed is:

1. A process for the condensation of a compound having a silicon bonded hydroxy or alkoxy group in the presence of a catalytic amount of one or more materials providing in the reaction mixture an anion comprising at least one quadri-substituted boron atom and protons capable of interaction with at least one of said silicon bonded hydroxy or alkoxy groups.

2. A process according to claim 1 wherein the substituents on each boron atom include halogenated hydrocarbon groups.

3. A process according to claim 2 wherein the hydrocarbon groups are aromatic groups.

4. A process according to claim 3 wherein the hydrocarbon groups are highly fluorinated phenyl groups.

5. A process according to claim 4 wherein the highly fluorinated phenyl groups are selected from the group consisting of pentafluorinated phenyl groups and bis (trifluoromethyl) phenyl groups.

6. A process according to claim 1, wherein the anion is selected from the group consisting of $\{B(C_6F_5)_4\}^-$ and $\{B(C_6(CF_3)_2H_3)_4\}^-$.

7. A process according to claim 1 wherein the anion comprises two quadri-substituted boron atoms.

8. A process according to claim 7 wherein the anion is $H^+\{B(C_6F_5)_3CNB(C_6F_5)_3\}^-$.

9. A process according to claim 1 wherein the anion is a carborane.

10. A process according to claim 9 wherein the anion is selected from $\{CB_9H_{10}\}^-$, $\{CB_9X_5H_5\}^-$, $\{CB_{11}H_{12}\}^-$, and $\{CB_{11}X_6H_6\}^-$ wherein X represents fluorine, chlorine, bromine or iodine.

11. A process according to claim 1 wherein the compound having silicon bonded hydroxy or alkoxy groups has at least one unit according to the general formula $R^o{}_aR^1{}_bR^2{}_c SiO_{(4-(a+b+c)/2)}$ in which each $R^o$ is the same or different and represents a hydroxy, alkoxy, alkoxyalkoxy or hydrocarbonoxy group having up to 10 carbon atoms, each $R^1$ is the same or different and represents hydrogen or a monovalent substituted or unsubstituted hydrocarbon group, each $R^2$ is the same or different and represents a divalent substituted or unsubstituted alkylene or oxyalkylene group, a has a value of 1, 2, 3 or 4, b has a value of 0, 1, 2 or 3 and c has a value of 0, 1, 2 or 3.

12. A process according to claim 11 wherein the compound having a silicon bonded hydroxy or alkoxy group comprises an α,ω-dihydroxy-polydiorganosiloxane according to the general formula HO $(SiMe_2O)_n$H where n has a value from about 4 to about 40.

13. A process according to claim 12 wherein the compound having a silicon bonded hydroxy or alkoxy group also comprises a polydiorganosiloxane according to the formula $R^1_3SiO\{R^1_2SiO\}_nSiR^1_3$ where each $R^1$ may be the same or different and represents a hydrogen atom, or an alkyl group, or an alkenyl group and each n is the same or different and has a value up to 100.

14. A process according to claim 13 wherein the compound having a silicon bonded hydroxy or alkoxy group also comprises one or more silane according to the general formula $R^o{}_aR^1{}_bSi$ where $R^o$ and $R^1$ are as specified in claim 11, a has the value of 1, 2 or 3, b has the value 1, 2 or 3 and a+b has the value 4.

15. A process according to claim 1 wherein the catalyst is neutralised by addition of a basic substance.

16. A process according to claim 15 wherein the basic substance comprises an organic amine.

17. A process according to claim 1 wherein the catalyst is neutralised by heating.

* * * * *